Nov. 7, 1933.   W. B. RAYTON   1,934,561
LENS SYSTEM
Filed March 10, 1932
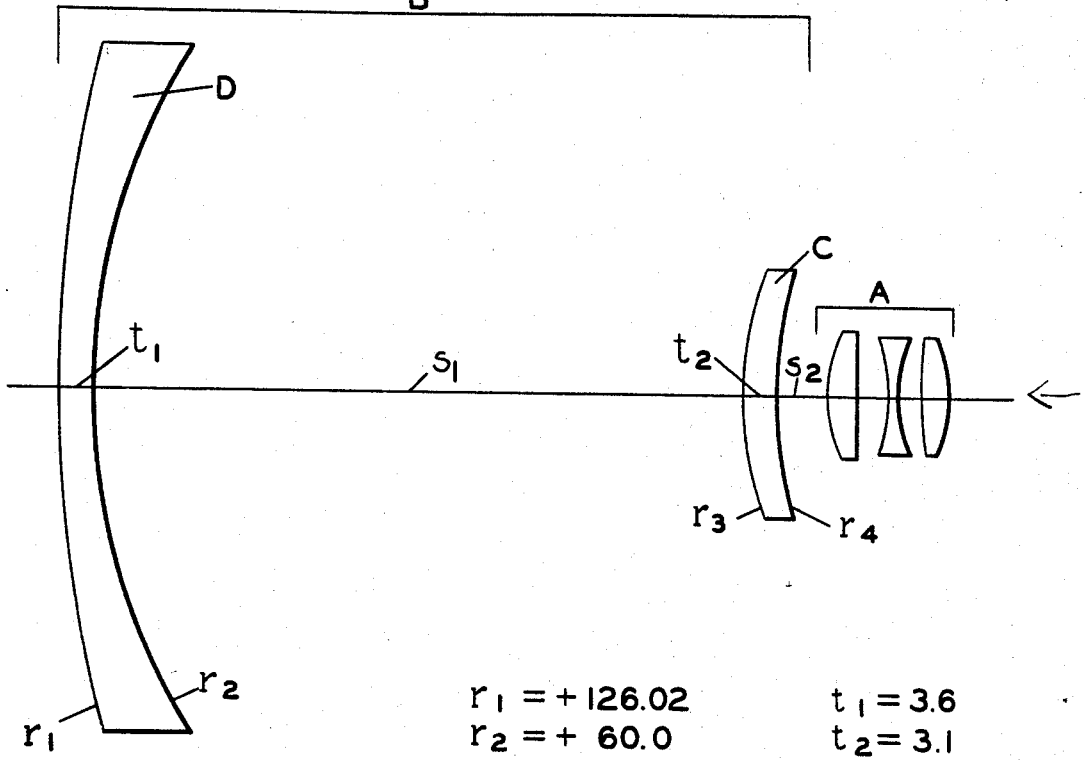
$r_1 = +126.02$   $t_1 = 3.6$
$r_2 = + 60.0$    $t_2 = 3.1$
$r_3 = + 32.10$   $s_1 = 63.0$
$r_4 = + 40.76$   $s_2 = 5.0$
D
$n_d = 1.5230$
$\nu = 58.5$
C
$n_d = 1.6657$
$\nu = 32.5$
WILBUR B. RAYTON
INVENTOR
BY *G. A. Ellestad*
ATTORNEY Patented Nov. 7, 1933

1,934,561

UNITED STATES PATENT OFFICE 1,934,561

LENS SYSTEM

Wilbur B. Rayton, Rochester, N. Y., assignor to Bausch & Lomb Optical Company, Rochester, N. Y., a corporation of New York Application March 10, 1932. Serial No. 597,911

4 Claims. (Cl. 88—57)

This invention relates to optical instruments and more particularly it has reference to lenses which may be used in cameras or in projection devices, such as those which are used for producing or projecting motion pictures.

In designing wide angle lenses to cover a relatively small area such as that of a motion picture frame, for example, the back focus is often so short that the mechanical structure of the camera or projector makes it impossible to bring the lens close enough to the film to secure a sharp focus. In order to overcome this difficulty it has been proposed to provide a lens system having a relatively long back focus by mounting a negative lens element in front of a standard photographic or projection objective at a distance greater than the distance to the first principal focus. Such a lens system will, of course, have a shorter equivalent focal length and a longer back focus than the standard lens. The negative element of such a lens system introduces distortion since the principal rays of the image forming rays must pass through the center of the diaphragm of the positive element, the standard lens, if the desired increase in angular field of view is to be obtained. If such a combination is used as a projection lens cushion-shaped distortion is present and when used as a photographic lens barrel-shaped distortion is present. Hence, it is apparent that such a proposed combination of a negative element and a standard lens does not produce an image of good quality.

One of the objects of my invention is to provide an improved supplementary lens combination which can be used with a standard objective lens to provide a lens system having a relatively long back focus. Another object is to provide a supplementary lens combination which when used with a standard objective lens will produce an image that is substantially free from distortion. A further object is to provide a supplementary lens combination comprising spaced positive and negative elements adapted to be used with a standard objective to provide a lens system having a relatively long back focus. A further object is to provide a wide angle lens having a relatively high aperture. Other objects and advantages reside in certain novel features of construction, arrangement and combination of parts as will hereinafter be more fully described.

One embodiment of my invention is shown in the figure of the drawing wherein A indicates a standard photographic or projection objective of any suitable structure and B indicates my supplementary lens combination. The combination B comprises the two spaced lens elements C and D. The positive element C is positioned between the standard lens A and its first principal focus while the negative element D is positioned beyond the first principal focus of the standard lens A. Because of their respective positions relative to the first principal focus of the standard lens both the positive element C and the negative element D operate to make the equivalent focal length of the system shorter than that of the standard lens. The positive element C tends to make the back focus of the whole system shorter than that of the standard lens while the negative lens D tends to make it longer. In general, the sum of the two effects may be zero or a small finite effect of either the plus or minus sign but since the equivalent focal length of the system has been reduced, the final effect is that of a short focus lens with the back focus of a longer focus lens.

This construction provides, now, if we neglect the standard lens, a negative element and a positive element both lying ahead of the diaphragm or crossing point of the principal rays. The distortion introduced by the negative element can therefore be compensated by the distortion of opposite sign introduced by the positive element when the powers and positions have been determined by methods well understood by lens designers.

On the drawing I have shown one embodiment of invention comprising a standard lens A, of a well known structure, having a focal length of 32 mm. and an aperture of F:2.7. With this standard lens A I have combined the negative lens element D and the positive element C. This combination provides a wide angle lens having a focal length of 25 mm. and an aperture of F:2.5. The specifications for the elements C and D are given in the following table:

| $r_1=+126.02$ mm. | $t_1=3.6$ mm. |
| $r_2=+60.0$ | $t_2=3.1$ |
| $r_3=+32.10$ | $s_1=63.0$ |
| $r_4=+40.76$ | $s_2=5.0$ |

| D | C |
|---|---|
| $n_d=1.5230$ | $n_d=1.6657$ |
| $\sqrt{}=58.5$ | $\sqrt{}=32.5$ |

In some cases, it is possible to use simple lenses for the elements C and D, obtaining freedom from chromatic aberration by an appropriate selection of glasses and reducing the aberrations which affect the image quality in the margin of the field by using an appropirate shape for the elements. Inasmuch as the focal lengths of the added elements may be long in comparison with that of the standard lens, spherical aberration is not seriously affected.

However, it may sometimes be desirable or necessary to make either or both of the elements C and D of compound form so as to correct for chromatic and/or other aberrations in order to provide good image quality together with the desired equivalent focal length and back focus. Or, it may, in some cases be possible to alter the structure of the standard lens so that the aberrations of the standard lens compensate the uncorrected aberrations of the added elements. It is to be understood, of course, that such modifications are within the scope of my invention.

From the foregoing it will be apparent that I am able to provide a supplementary lens combination which can be used with a standard lens to form a lens system, having a shorter equivalent focal length and a relatively long back focus, which will project an image that is substantially free from distortion. The term "standard lens" as used in the specification and claims is to be understood as indicating any suitable projection or photographic objective of well known structure.

I claim:

1. A lens system comprising a standard lens, a negative element positioned beyond the first principal focus of the standard lens and a positive element positioned between the standard lens and its first principal focus.

2. A lens system comprising a standard lens, a meniscus shaped negative element positioned beyond the first principal focus of the standard lens and a meniscus shaped positive element positioned between the standard lens and its first principal focus, the concave sides of said elements facing said standard lens.

3. A lens system comprising a standard lens, a positive lens element and a negative lens element, said positive element being positioned adjacent to said standard lens and inside the first principal focus of the latter, said negative element being positioned beyond the first principal focus of the standard lens.

4. A lens system comprising a standard objective lens, a meniscus shaped negative lens element positioned in front of said standard lens and a meniscus shaped positive lens element positioned between said negative lens element and said standard lens, the concave sides of said elements facing the standard lens.

WILBUR B. RAYTON.